(12) United States Patent
Ganguly (10) Patent No.: US 7,631,147 B2
(45) Date of Patent: Dec. 8, 2009

(54) EFFICIENT FLUSHING OF TRANSLATION LOOKASIDE BUFFERS IN A MULTIPROCESSOR ENVIRONMENT

(75) Inventor: Shuvabrata Ganguly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 393 days.

(21) Appl. No.: 11/635,105

(22) Filed: Dec. 6, 2006

(65) Prior Publication Data

US 2008/0140897 A1    Jun. 12, 2008

(51) Int. Cl.
*G06F 12/06*    (2006.01)
(52) U.S. Cl. ........................... 711/135; 711/202
(58) Field of Classification Search ............... 711/133, 711/139, 205, 207, 209, 170, 135, 202, 203
See application file for complete search history.

(56) References Cited

U.S. PATENT DOCUMENTS

| | | | | |
|---|---|---|---|---|
| 4,733,348 | A | 3/1988 | Hiraoka et al. | 711/207 |
| 5,317,705 | A | 5/1994 | Gannon et al. | 718/100 |
| 5,317,754 | A | 5/1994 | Blandy et al. | 718/100 |
| 5,428,757 | A | 6/1995 | Sutton | 718/107 |
| 5,455,922 | A | 10/1995 | Eberhard et al. | 711/154 |
| 5,805,790 | A * | 9/1998 | Nota et al. | 714/10 |
| 5,906,001 | A | 5/1999 | Wu et al. | 711/154 |
| 5,928,353 | A | 7/1999 | Yamada | 712/200 |
| 6,510,508 | B1 | 1/2003 | Zuraski, Jr. et al. | 711/207 |
| 6,907,600 | B2 * | 6/2005 | Neiger et al. | 717/139 |
| 7,069,389 | B2 | 6/2006 | Cohen | 711/135 |
| 7,484,073 | B2 * | 1/2009 | Cohen et al. | 711/207 |
| 7,509,475 | B2 * | 3/2009 | Shinohara et al. | 711/207 |
| 2004/0025161 | A1 | 2/2004 | Chauvel et al. | 718/102 |
| 2006/0259732 | A1 * | 11/2006 | Traut et al. | 711/173 |

OTHER PUBLICATIONS

Black, D.L. et al., "Translation Lookaside Buffer Consistency: A Software Approach," *ACM*, 1989, 113-122.
Chang, M-S et al., "Lazy TLB Consistency for Large-Scale Multiprocessors," *IEEE*, 1997, 308-315.
Rosenburg, B., "Low-Synchronization Translation Lookaside Buffer Consistency in Large-Scale Shared-Memory Multiprocessors," *ACM*, 1989, 137-146.

* cited by examiner

*Primary Examiner*—Pierre-Michel Bataille
(74) *Attorney, Agent, or Firm*—Woodcock Washburn LLP (57) ABSTRACT

Various operations are disclosed for improving the operational efficiency of address mapping caches, such as translation lookaside buffers, in a multiprocessor environment. When an address mapping translation is invalidated, unnecessary address mapping cache flushes are avoided by signaling only those processors operating in a virtual machine monitor mode to flush their address mapping caches. Address mapping cache flushes for processors operating in guest modes are postponed until the processor enters a virtual machine monitor mode. Optionally, a counter is maintained for each processor and incremented each time the processor enters virtual machine monitor mode. When an address mapping cache is invalidated, a snapshot of the counter values is stored. When an new address translation for an invalidated address translation is requested, the snapshot is compared with the current value of a counter to determine whether the address mapping cache associated with the counter has been flushed since the invalidation.

17 Claims, 10 Drawing Sheets

EFFICIENT FLUSHING OF TRANSLATION LOOKASIDE BUFFERS IN A MULTIPROCESSOR ENVIRONMENT

BACKGROUND

A virtual machine ('VM') is a software construct or the like operating on a computing device or the like (i.e., a 'host') for the purpose of providing an emulated machine or system. Typically, although not necessarily, the VM is an application or the like, and may be employed on the host to instantiate a use application or the like while at the same time isolating such use application from such host device or from other applications on such host. In one typical situation, the host can accommodate a plurality of deployed VMs, each VM performing some predetermined function by way of resources available from the host.

Notably, each VM as hosted on a computing device is for all intents and purposes a computing machine, although in virtual form, and thus represents itself as such both to the use application thereof and to the outside world. As an example, the VM and/or a use application thereof can and in fact do issue hardware requests for hardware resources of the VM, even though the VM might not in reality have such hardware resources. Instead, and as may be appreciated, such hardware requests are intercepted or otherwise redirected toward the host, and such host services such hardware requests based on the hardware resources thereof, typically with the requesting VM and/or use application thereof being none the wiser.

Typically, although not necessarily, a host deploys each VM thereof in a separate partition, address space, processing area, and/or the like. Such host may include a virtualization layer with a virtual machine monitor ('VMM') or the like that acts as an overseer application or 'hypervisor', where the virtualization layer oversees and/or otherwise manages supervisory aspects of each VM of the host, and acts as a possible link between each VM and the outside world. The VMM may be a separate application running in its own address space or may be integrated more closely with the host operating system, either directly or as an operating system extension of some sort, such as a device driver. Notably, the VMM of the host may intercept or otherwise redirect hardware requests that originate from each VM of the host and/or a use application thereof, and may at least assist in servicing the requests, again with the requesting VM and/or use application thereof being none the wiser.

Many computing systems comprise multiple processors. Processors in a multiprocessor virtual machine environment may operate in a guest mode or in a VMM mode. When running in a guest mode, a processor uses virtual machine definitions to manage the virtual machine's guest operating system and applications, translating arguments and managing system resources without intervention from the VMM. From time to time, the guest operating system or applications may need system resources that must be managed by the VMM. As examples, the VMM may be required for error handling, system faults, or interrupt handling. In these situations, the processor operates in a VMM mode.

Overall performance of a computer system may depend heavily on the efficiency of the memory hierarchy. The memory system performance is dependent not only on data caches, but also on address caches. A translation lookaside buffer (TLB) is a cache that is used to speed up address translation in a paged virtual memory system. The cache is implemented on-chip to reduce memory access delay.

A TLB is a virtual cache which retrieves a physical address indexed by a virtual address. Without a TLB, every instruction or data reference would require additional memory accesses to the page table. The paging information is stored in a page table entry (PTE) resident in main memory, and its copy is cached into a TLB entry. Inconsistency between a PTE and TLB entry might occur in uniprocessors when an application invokes a virtual memory operation updating a PTE, e.g., a virtual memory operation issued by a user application for memory allocation, deallocation, attribute modification, etc. A uniprocessor maintains consistency by invalidating or flushing the TLB after updating a PTE, since the uniprocessor knows when inconsistency occurs and only a local TLB is involved.

In a shared memory multiprocessor (SMP) environment, multiple threads can be associated with a single application. These threads run independently on different processors, but they all have to share the same address space. Since these threads share the common set of page tables, the same page table entry can be cached into multiple TLBs. If any of the threads updates such a replicated PTE, it causes an inconsistent state between the updated PTE and the TLBs. The problem caused by such inconsistent state is referred to as the TLB consistency problem. TLB consistency is also a concern in a multiprocessor virtual machine computing environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Mechanisms for efficiently promoting translation lookaside buffer consistency in a multiprocessor virtual machine environment are described herein. Processors in such an environment may operate in a guest mode or in a virtual machine monitor mode. When the operation of one processor leads to the invalidation of a TLB entry, it may be necessary to flush the TLBs on various others of the processors in the environment. Flushing the other TLBs may be initiated by sending an inter-processor interrupt (IPI) to the other processors, requesting TLB flushes. Processing IPIs can be computationally costly, sometimes requiring thousands or even tens of thousands of cycles. When a TLB flush is requested, the TLBs of processors that are executing in guest mode are not flushed immediately, but rather when the processors enter virtual machine monitor mode. On some systems, this may be accomplished automatically when the processor enters VMM mode. On other systems, a flag associated with a processor may be set to indicate that the TLB of the processor is to be flushed when the processor enters VMM mode. In some embodiments, counters are used to keep track of processors entering VMM mode. When a TLB is invalidated, the values of the counters are stored. When a new address translation corresponding to an invalidated translation is used, current counter values are compared with stored values to determine whether TLBs have already been flushed when their associated processors entered VMM mode after the counter values were stored.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program (s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Overview

Various methods and systems are described for efficiently flushing address mapping caches, such as translation lookaside buffers (TLBs), in a multiprocessor virtual machine environment. In a multiprocessor computing environment, some operations may invalidate the entries in a TLB associated with one processor, necessitating the flushing of TLBs associated with other processors before new address translations corresponding to outdated address translations can be used. In one aspect of the described methods and systems, only processors operating in virtual machine monitor mode are signaled to flush their associated TLBs. The initiating processor may wait for an indication from the signaled processors that they have complete flushing their associated TLBs before resuming its own processing. By not signaling processors operating in guest mode, unnecessary TLB flushes may be postponed or avoided completely. The number of processor cycles spent on TLB flushes and the amount of time the initiating processor must wait to receive completion signals are thereby reduced and overall computational efficiency is improved.

In another aspect of the described methods and systems, a flag may be associated with each processor. When an TLB is invalidated, the flags of at least those processors operating in guest mode are set. When a processor enters VMM mode with its flag set, the TLB associated with the processor is flushed.

In another aspect of the described methods and systems, a counter is associated with each processor and updated each time the processor enters a VMM mode. When an address mapping translation is invalidated, the values of the counters are recorded. Later, when a new address mapping translation corresponding to the invalidated address mapping translation is requested, the current values of the counters are compared to the valued recorded when the address mapping translation was invalidated. If the compared values for a counter are identical, the processor associated with the counter has not entered VMM mode since the address mapping translation was invalidated. In that case, the TLB associated with the processor is flushed. The TLB may be flushed immediately if the processor is in VMM mode. Alternatively, a flag associated with the processor may be set if the processor is in guest mode and the TLB flushed at a later time when the processor enters VMM mode with its flag set.

The methods and systems described herein achieve improvements over the state of the art by eliminating some unnecessary TLB flushes and by reducing the number of inter-processor interrupts that are sent.

Virtualization in General

Diversity in operating systems and processor instruction sets can lead to reduced interoperability of software. Memory and I/O abstractions, both in high-level languages and in operating systems can remove some hardware resource dependencies, but some remain. Many operating systems are developed for a specific system architecture and are designed to manage hardware resources directly. This can limit the flexibility of a computer system in terms of available software and operating systems and can negatively impact security and failure isolation, especially when a system is shared by multiple users.

Virtualization provides a mechanism for increasing flexibility while enhancing security and reliability. Processors, memory, and I/O devices are examples of subsystems that can be virtualized. When a subsystem is virtualized, a virtual interface and virtual resources available through the virtual interface are mapped onto the interface and resources of a real system on which the virtualization is implemented. Virtualization can be applied not only to subsystems, but to an entire machine. A virtual machine's architecture is implemented in a layer of software on a real machine.

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

Figure 1:
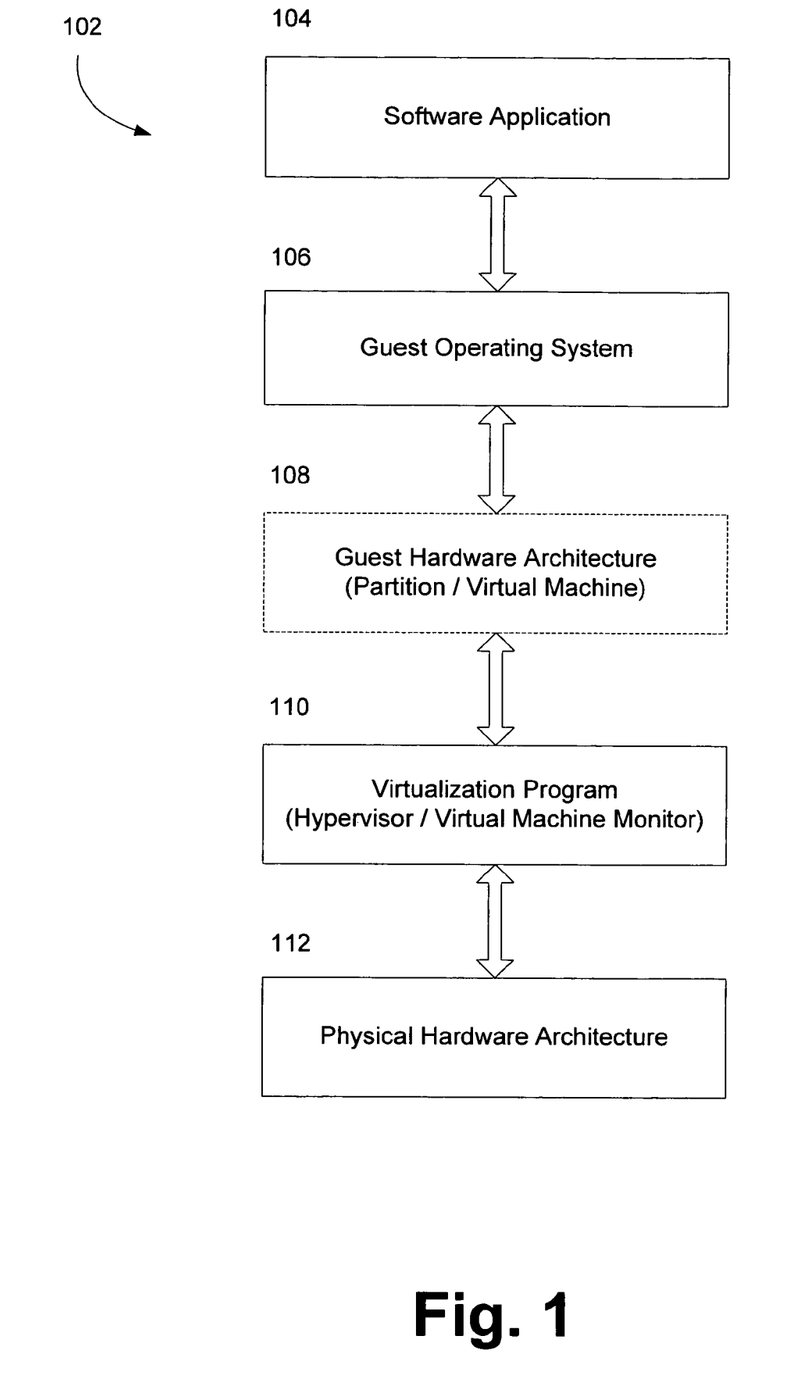
FIG. 1 is a block diagram representing the logical layering of the hardware and software architecture for a virtualized operating environment in a computer system.

FIG. 1 is a diagram representing the logical layering of the hardware and software architecture for a virtualized environment in a computer system. In FIG. 1, a virtualization program 110 runs directly or indirectly on the physical hardware architecture 112. The virtualization program 110 may be (a) a virtual machine monitor that runs alongside a host operating system or (b) a host operating system with a hypervisor component, where the hypervisor component performs the virtualization. The term virtual machine monitor is used as a general term for any of the various types of virtualization programs. The virtualization program 110 virtualizes a guest hardware architecture 108 (shown as dashed lines to illustrate the fact that this component is a partition or a "virtual machine"), that is, hardware that does not actually exist but is instead virtualized by the virtualizing program 110. A guest operating system 106 executes on the guest hardware architecture 108, and a software application 104 can run on the guest operating system 106. In the virtualized operating environment of FIG. 1, the software application 104 can run in a computer system 102 even if the software application 104 is designed to run on an operating system that is generally incompatible with a host operating system and the hardware architecture 112.

Figure 2:
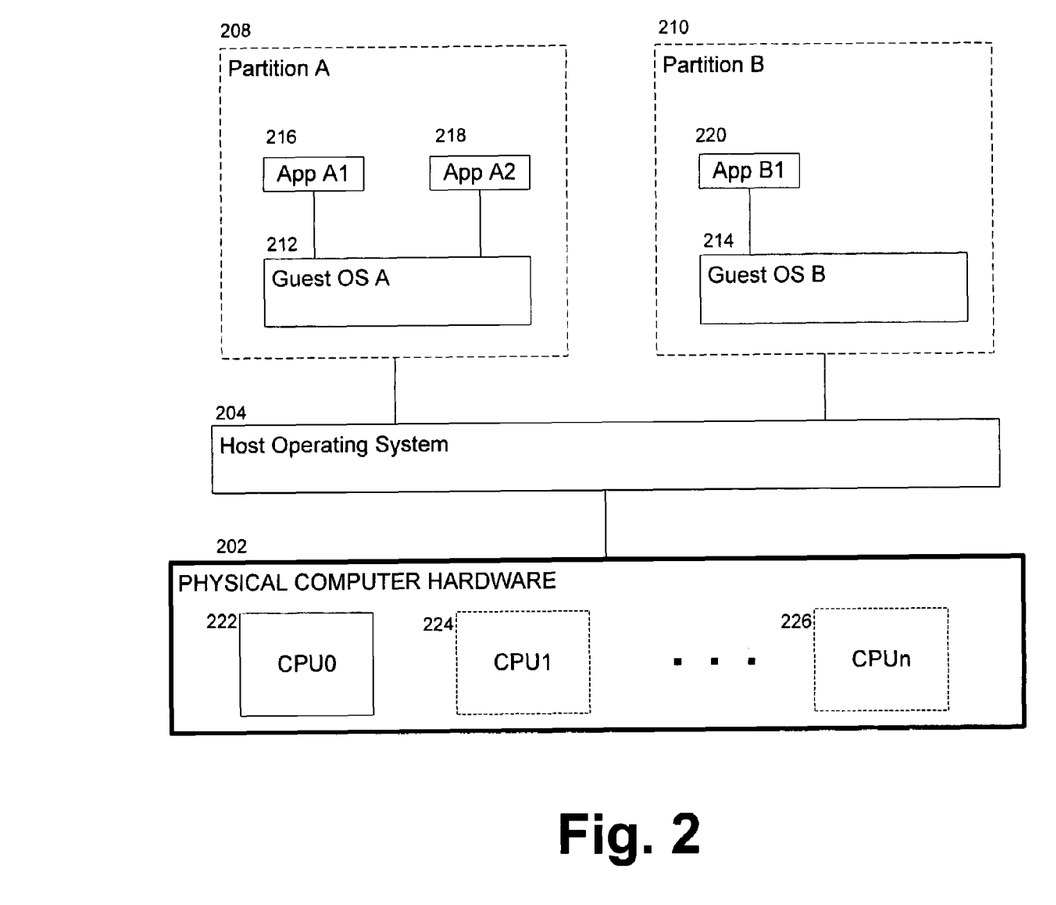
FIG. 2 is a block diagram representing a virtualized computing system, where virtualization is performed by the host operating system (either directly or via a hypervisor)

Next, FIG. 2 illustrates a virtualized computing system comprising a host operating system (host OS) software layer 204 running directly above physical computer hardware 202, where the host OS 204 provides access to the resources of the physical computer hardware 202 by exposing interfaces to partitions A 208 and B 210 for the use by operating systems A and B, 212 and 214, respectively. This enables the host OS 204 to go unnoticed by operating system layers 212 and 214 running above it. Again, to perform the virtualization, the host OS 204 may be a specially designed operating system with native virtualization capabilities or, alternately, it may be a standard operating system with an incorporated hypervisor component for performing the virtualization (not shown).

Referring again to FIG. 2, above the host OS 204 are two partitions, partition A 208, which may be, for example, a virtualized Intel 386 processor, and partition B 210, which may be, for example, a virtualized version of one of the Motorola 680X0 family of processors. Within each partition 208 and 210 are guest operating systems (guest OSs) A 212 and B 214, respectively. Running on top of guest OS A 212 are two applications, application A1 216 and application A2 218, and running on top of guest OS B 214 is application B1 220.

In regard to FIG. 2, it is important to note that partition A 208 and partition B 214 (which are shown in dashed lines) are virtualized computer hardware representations that exist only as software constructions. They are made possible due to the execution of specialized virtualization software(s) that not only presents partition A 208 and partition B 210 to Guest OS A 212 and Guest OS B 214, respectively, but which also performs all of the software steps necessary for Guest OS A 212 and Guest OS B 214 to indirectly interact with the real physical computer hardware 202. The physical computer hardware 202 may comprise a single central processing unit (CPU) 222, as in a uniprocessor environment, or multiple CPUs 222, 224, 226 as in a multiprocessor environment.

Figure 3:
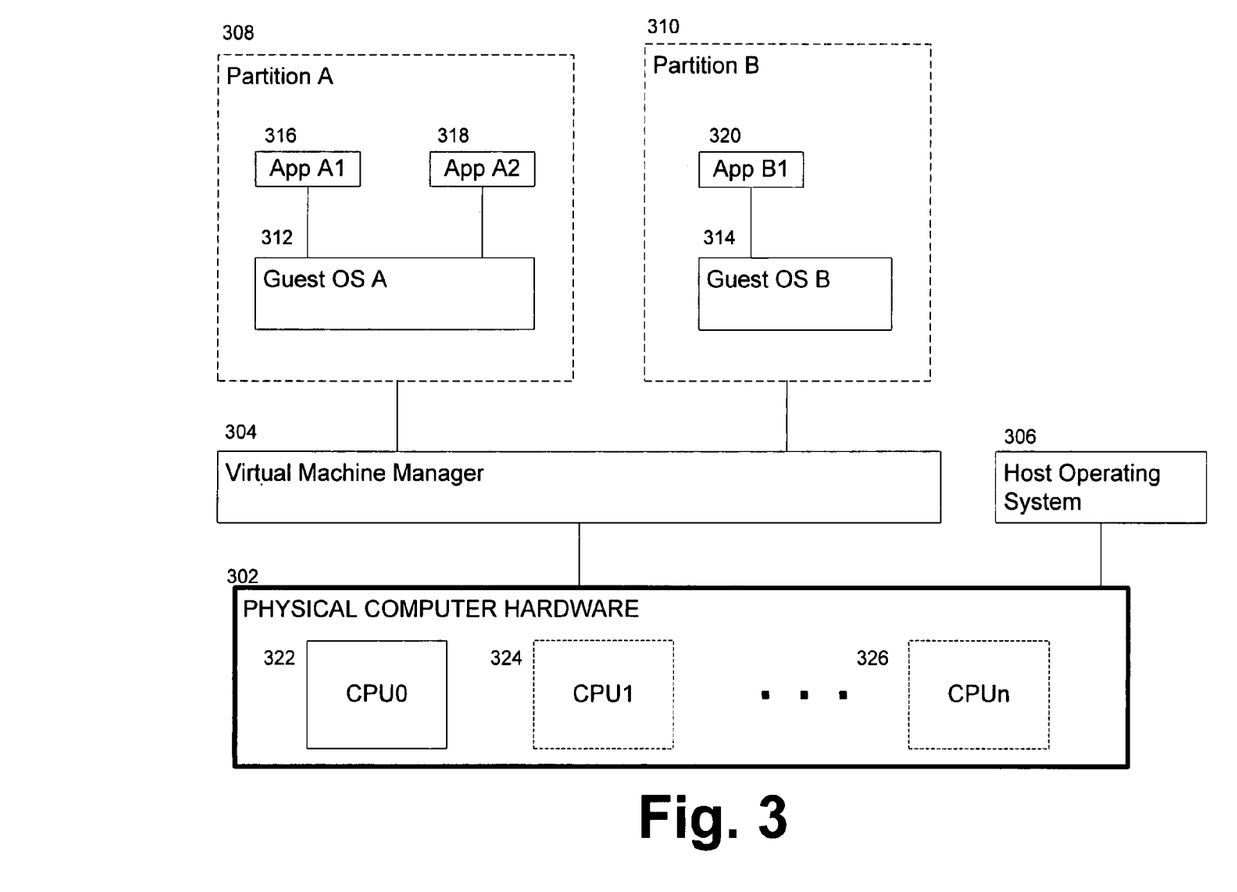
FIG. 3 is a block diagram representing an alternative virtualized computing system, where virtualization is performed by a virtual machine monitor (VMM) running alongside a host operating system.

FIG. 3 illustrates an alternative virtualized computing system where the virtualization is performed by a virtual machine monitor (VMM) 304 running alongside the host operating system 306. In certain cases, the VMM 304 may be an application running above the host operating system 306 and interacting with the computer hardware 302 only through the host operating system 306. In other cases, such as shown in FIG. 3, the VMM 304 may instead comprise a partially independent software system that on some levels interacts indirectly with the computer hardware 302 via the host operating system 306, but on other levels the VMM 304 interacts directly with the computer hardware 302 (similar to the way the host operating system interacts directly with the computer hardware). And yet in other cases, the VMM 304 may comprise a fully independent software system that on all levels interacts directly with the computer hardware 302 (similar to the way the host operating system interacts directly with the computer hardware) without utilizing the host operating system 306 (although still interacting with the host operating system 306 in order to coordinate use of the computer hardware 302 and avoid conflicts and the like).

In the example illustrated in FIG. 3, two partitions, A 308 and B 310, lie conceptually above the VMM 304. Within each partition 308 and 310 are guest operating systems (guest OSs) A 312 and B 314, respectively. Running on top of guest OS A 312 are two applications, application A1 316 and application A2 318, and running on top of guest OS B 314 is application B1 320. The physical computer hardware 302 may comprise a single central processing unit (CPU) 322, as in a uniprocessor environment, or multiple CPUs 322, 324, 326 as in a multiprocessor environment.

Figure 4:
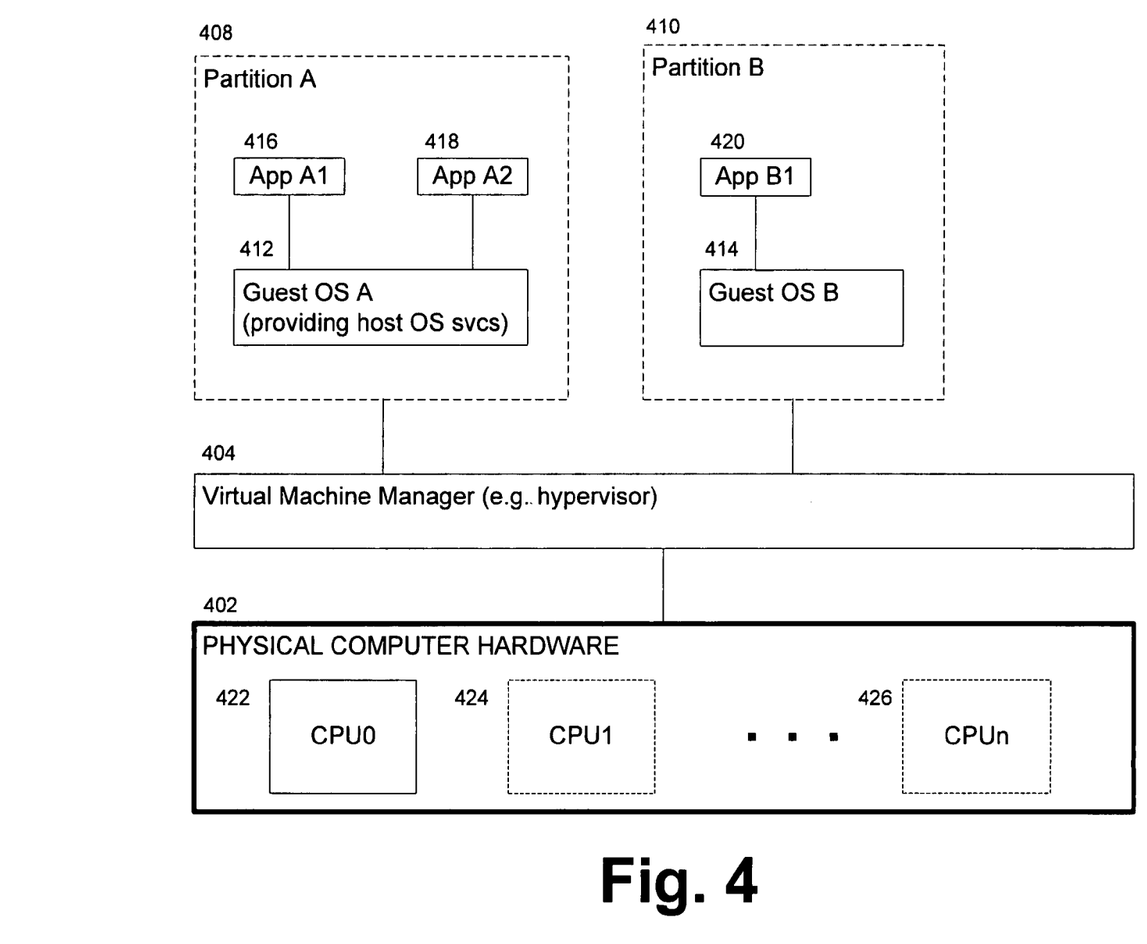
FIG. 4 is a block diagram representing another alternative virtualized computing system, where virtualization is performed by a virtualizer running independent of a host operating system.

FIG. 4 illustrates another alternative virtualized computing system where the virtualization is performed by a hypervisor 404. The hypervisor 404 comprises an independent software system that may interact directly with the computer hardware 402 without using a host operating system. The physical computer hardware 402 may comprise a single central processing unit (CPU) 422, as in a uniprocessor environment, or multiple CPUs 422, 424, 426 as in a multiprocessor environment.

In the example illustrated in FIG. 4, two partitions, A 408 and B 410, lie conceptually above the VMM 404. Within each partition 408 and 410 are guest operating systems (guest OSs) A 412 and B 414, respectively. Running on top of guest OS A 412 are two applications, application A1 416 and application A2 418, and running on top of guest OS B 414 is application B1 420. Guest OS A 412 provides host OS services. The physical computer hardware 402 may comprise a single central processing unit (CPU) 422, as in a uniprocessor environment, or multiple CPUs 422, 424, 426 as in a multiprocessor environment.

All of these variations for implementing the above mentioned partitions are just exemplary implementations, and nothing herein should be interpreted as limiting the disclosure to any particular virtualization aspect.

Address Translations and Caches

As mentioned above, a virtual machine monitor (VMM) is a program that creates and manages virtual machines, each with virtualized hardware resources which may be backed by underlying physical hardware resources. The operating system that runs within a virtual machine can be referred to as a guest. Each page of guest memory may be backed by a page of physical memory, but the physical address exposed to the guest is typically not the same as the actual physical address on the physical machine. In addition, the guest should not be able to access physical memory that has not been allocated to the virtual machine.

Many processor architectures can enforce translations from virtual addresses (VA) to physical addresses (PA), specified by the operating system using data structures such as page tables. An address space can comprise of a tree of page tables, which may correspond to a mapping from VAs to PAs. Programs running on the operating system access memory via virtual addresses, which enable the operating system to virtualize their memory and control their access to memory. The VMM can make an additional translation from guest physical addresses (GPAs) to system physical addresses (SPAs) to virtualize guest memory.

Figure 5:
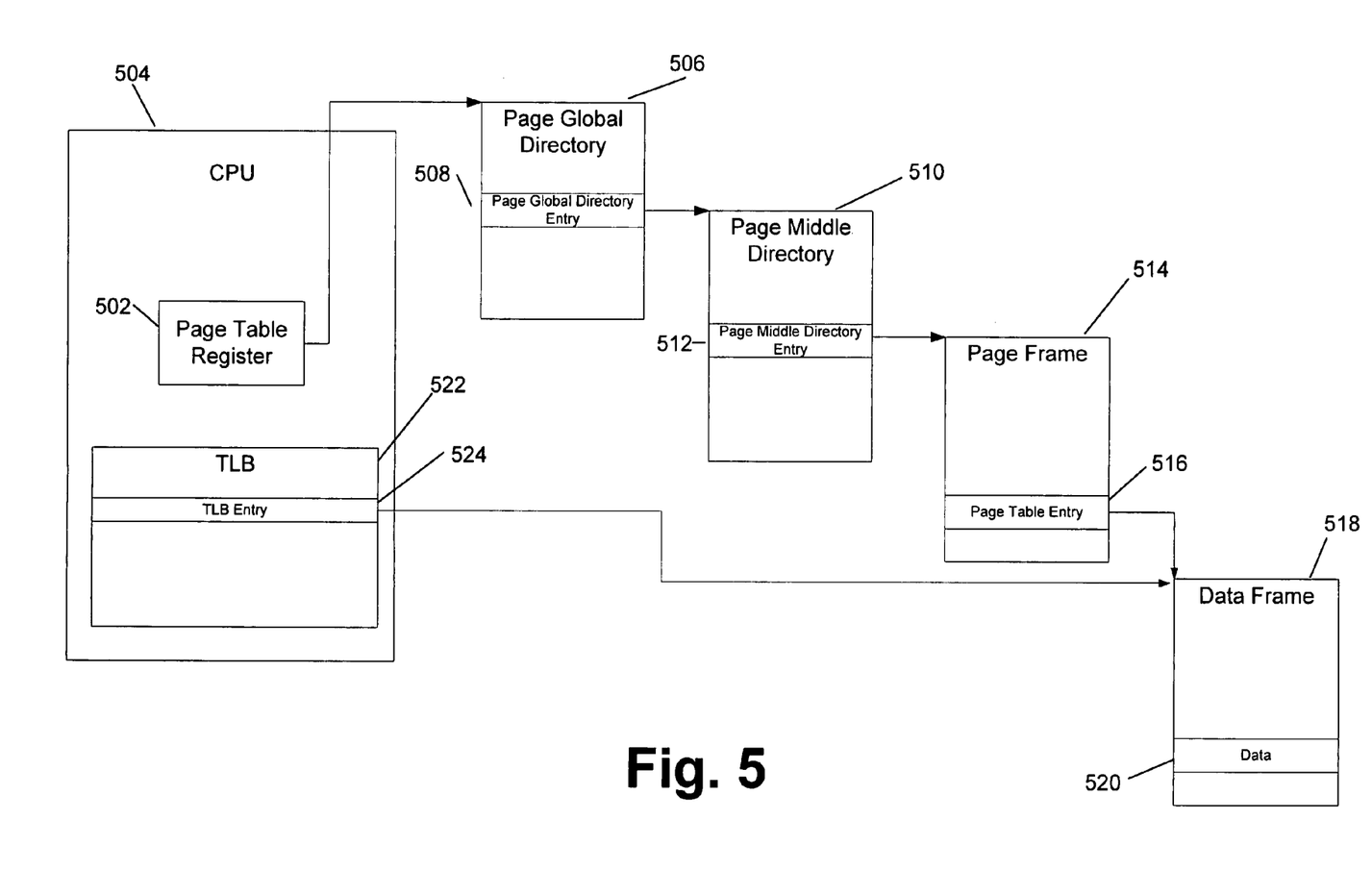
FIG. 5 is a block diagram representing the logical structures used in address translations.

A virtual address may be broken into multiple parts, each representing an offset into one level of the tree of page tables. FIG. 5 represents an example of the logical structures that may be used in translating a virtual address to a physical address. A page table register 502 is typically located on or near a CPU 504. For example, on an x86 chip, the page table register 502 is the cr3 register. The page table register 502 contains a pointer to the root level of the page table tree, denoted the page global directory 506. The first part of a linear virtual address is an offset into the page global directory 506 at which a page global directory entry 508 is found. The page global directory entry 508 is a pointer to a page middle directory 510. The second part of the linear virtual address is an offset into the page middle directory 510 at which a page middle directory entry 512 is found. The page middle directory entry 512 is a pointer to a page frame 514. The third part of the linear virtual address is an offset into the page frame 514 at which a page table entry 516 is found. The page table entry 516 is a pointer to a data frame 518. The fourth part of the linear virtual address is an offset into the data frame 518 at which the desired data 520 is found.

Initially, when a processor needs to map a virtual address to a physical address, it must traverse the entire tree of page tables such as described above. Traversing the tree of page tables entails considerable operational overhead. Every instruction that references memory could require numerous memory accesses to traverse the tree. Fortunately, most processes exhibit locality of reference, i.e., a large number of memory references refer to a small number of pages. A system architecture can take advantage of this locality of reference by providing a translation lookaside buffer (TLB) 522 which is a cache for virtual to physical page table translations. Each TLB entry 524 may contain a virtual address and a pointer to a corresponding data frame 518. Optionally, a TLB entry 522 may also comprise one or more status flags. Each processor in a multiprocessor system may have one or more associated TLBs. The TLBs enable the processors to avoid having to walk the page tables on every memory access, a procedure that would be computationally expensive.

Figure 6:
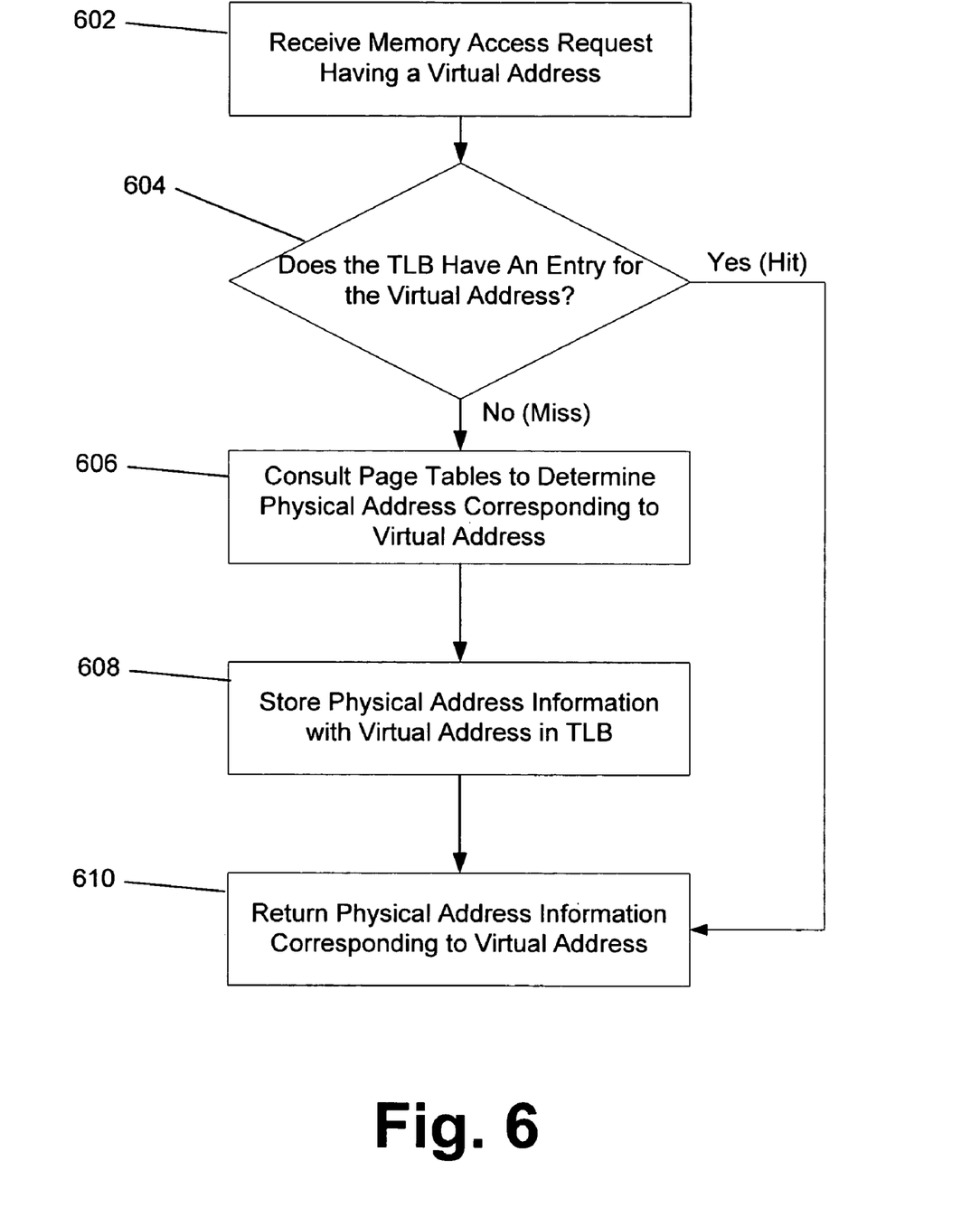
FIG. 6 is a flow chart illustrating how translation lookaside buffers (TLBs) are used and filled.

FIG. 6 is a flow chart illustrating generally how a TLBs is used and filled. A processor receives a memory access request having a virtual address is received 602. The processor's TLB is consulted 604 to determine whether the TLB contains a cached translation for the virtual address. If the TLB contains a translation for the virtual address, the processor uses it to obtain physical address information corresponding to the virtual address 610. When an requested VA is not cached in the TLB, a situation known as a TLB miss, the processor's memory management unit (MMU) must consult the page tables, traversing them starting from the base of the page table tree to resolve the VA 606. After resolving the address translation, the MMU then adds the VA-to-PA translation to the TLB, a process known as a TLB fill 608 and returns the physical address information corresponding to the virtual address 610. If the TLB is full, a previous translation may be overwritten to make room for the new translation.

Invalidating TLBs and Maintaining TLB Consistency

Figure 7:
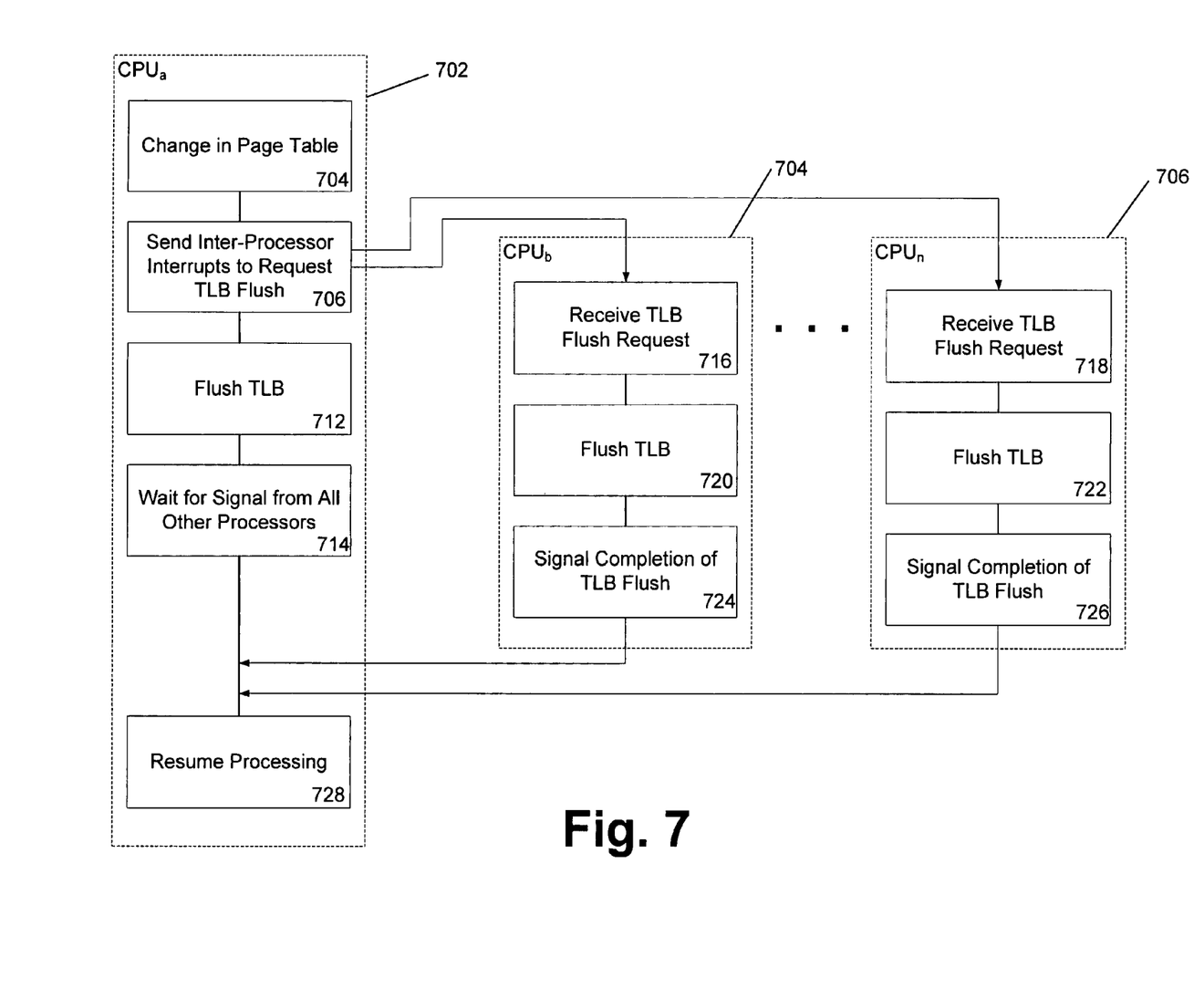
FIG. 7 is a flow chart depicting how invalid TLBs may be flushed from multiple processors.

In a shared memory multiprocessor system, several independent threads may share a single address space and use the same page table. Any given processor's TLB is not accessible from other processors. When a processor makes a change to a page table, it flushes outdated mapping information from its TLB. Invalidated TLB entries must also be flushed from the TLBs of other processors so that outdated address translations are not used. FIG. 7 is a flow chart depicting how invalid TLB entries can be flushed from multiple processors.

When the operation of a first CPU, CPUa 702, triggers a change in a page table 704, CPUa initiates inter-processor interrupts (IPIs) 706 to signal the other processors, CPUb 708 through CPUn 710, to flush their TLBs. Either before, after, or concurrent with sending the IPIs, CPUa 702 flushes its own TLB 712. CPUa 702 then suspends processing while waiting for signals from the other processors 714. The other processors, 708, 710 receive the TLB flush request 716, 718 respectively, in the form of IPIs. They flush their TLBs 720, 722 respectively. Each processor 708, 710 signals the initiating processor 701 upon completion of their TLB flushes 724, 726. Upon receiving completion signals from all of the other processors 708, 710, the initiating processor 702 resumes processing 728.

Changes to page tables occur quite frequently. Flushing the TLBs of all CPUS when the TLB associated with any one of the CPUs is invalidated is computationally expensive. Processing the IPIs and flushing the TLBs typically requires thousands or even tens of thousands of cycles. Processing on each CPU is interrupted while the TLB is flushed. Because the CPU initiating the requests waits for all other CPUs to signal that they have flushed their TLBs before resuming processing, the initiating CPU must idle for a significant amount of time when it could otherwise be processing. These factors all add significant computational overhead to an invalidation of a TLB, such as in a page table change.

A VMM typically resides in its own address space and has its own set of page tables. Typically, processors spend much more time executing in a guest mode than in a VMM mode. In an idle system, the fraction of time spent in VMM mode is often less than 1%. When a TLB flush is requested, TLBs of processors that are executing in a guest mode need not be flushed immediately.

Figure 8:
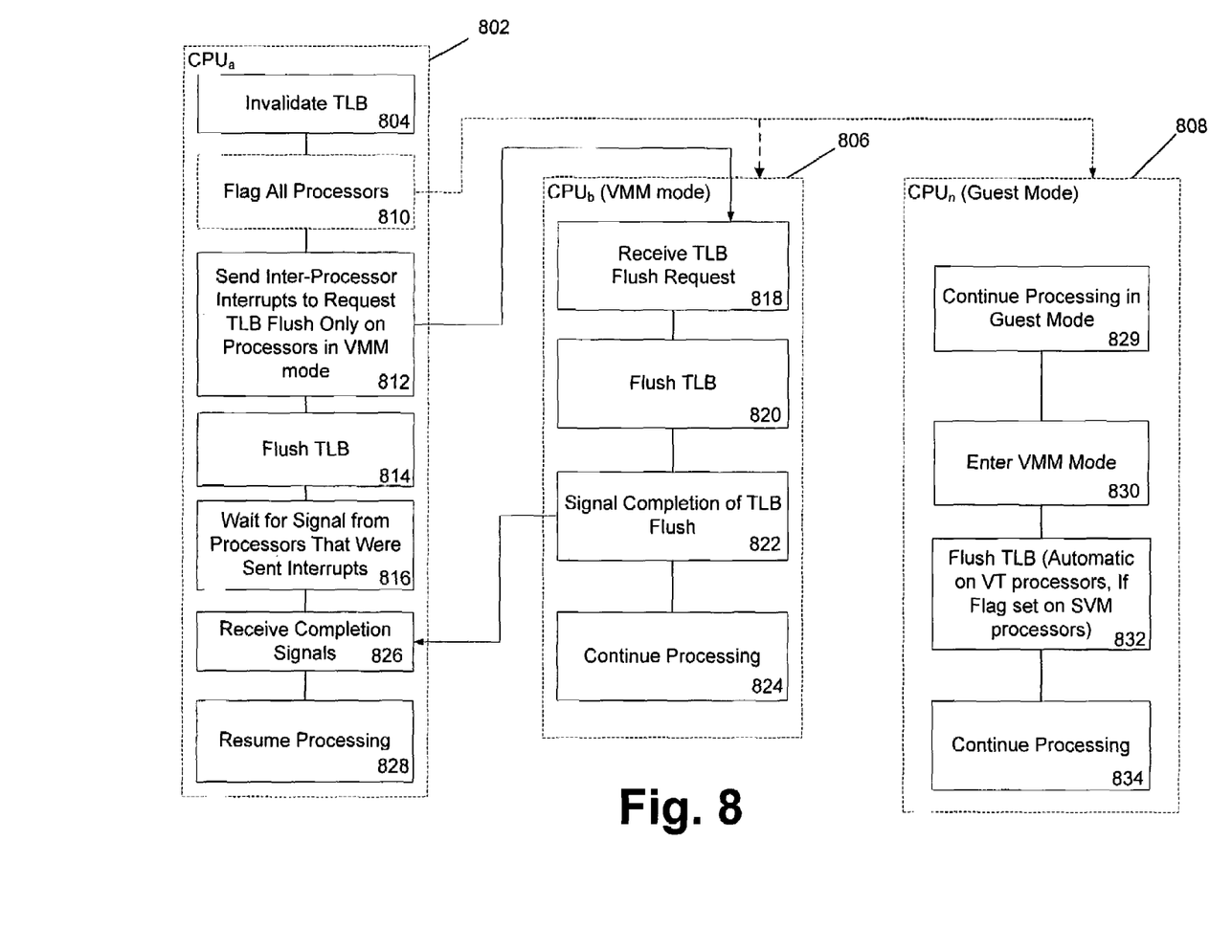
FIG. 8 is a flow chart depicting a way of flushing TLBs in accordance with the teachings herein.

FIG. 8 is a flow chart for an embodiment of an efficient way of flushing TLBs and maintaining TLB consistency. When the operation of an initiating processor, CPUa 802, leads to the invalidation of a TLB 804, such as, for example, by triggering a change in a page table, the other processors, 806, 808, are flagged 810 to indicate that their TLBs are no longer valid and need to be flushed. Generally, it may be advantageous to set a flag on all processors to avoid a race condition even though the flag may only be effective on those processors, such as CPUn 808, operating in a guest mode. The initiating processor, CPUa 802, send IPIs 812 requesting TLB flushes to processors that are operating in a VMM mode, such as CPUb 806. The initiating processor, CPUa 802, flushes its own TLB 814 and waits 816 for completion signals from those processors that were sent IPIs.

Each processor that receives a TLB flush request 818, such as CPUb 806, responds by flushing its own TLB 820, signaling the initiating processor 802 when the TLB flush is complete 822, and resuming its own processing 824. After the initiating processor 802 receives completion signals 826 from all of the processors 806 that were sent flush requests 812, the initiating processor resumes processing 828.

Processors such as CPUn 808 that were operating in a guest mode when the flags were set 810 need not immediately respond to the flag. Rather, those processors can continue processing in a guest mode 829. TLB consistency is not problematic until the processor switches from a guest mode to a VMM mode. When those processors later enter a VMM mode with their flag set 830, they must flush their TLBs 832 before continuing to process 834. By postponing TLB flushes until required, unnecessary TLB flushes may be prevented.

Because IPIs are sent only to processors operating in a VMM mode while most processors will usually be operating in a guest mode, the number of IPIs that are sent and processed is reduced, often drastically. Additionally, the initiating processor 802 need only wait for TLB flushes on, and responses from, a fraction of the processors, thereby reducing the amount of time the initiating process must wait after each TLB flush.

On Intel VT based processors, for example, a TLB is flushed automatically each time the processor associated with the TLB switches from a guest mode to a VMM mode. As a result, on those systems it is not necessary to flag other processors 810 when one processor invalidates its TLB 804 since the invalid TLB entries associated with another processor will be flushed. On processors that do not flush their TLBs on entry into VMM mode, such as AMD SVM based processors, flagging the processors 810 that are operating in guest mode is necessary so that those processors will flush invalidated TLB entries before attempting to use invalid translations after entering VMM mode. In practice, it may be preferred to flag all processors regardless of their current operating mode when a TLB is invalidated to avoid a possible race condition.

An alternative embodiment may be used on processors, such as, for example, Intel VT based processors, that automatically flush their TLBs upon switching from a guest mode to a VMM mode and may be used instead of or in conjunction with the embodiments described above. Each processor is associated with a counter. The counter associated with a processor is incremented each time the processor enters a VMM mode.

Figure 9:
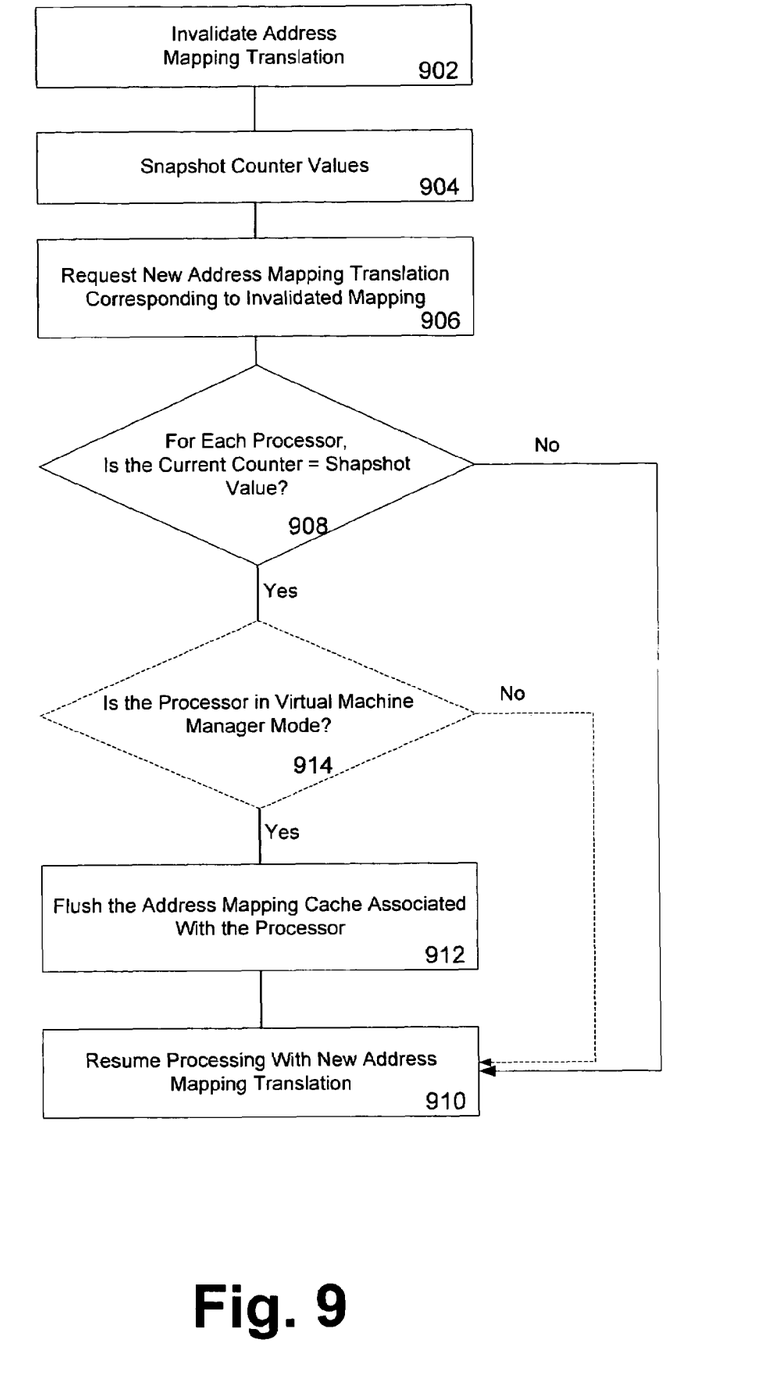
FIG. 9 is a flow chart depicting an alternative way of flushing TLBs in accordance with the teachings herein.

FIG. 9 is a flow chart depicting what happens when an address mapping translation is invalidated and a corresponding new address mapping is later requested. When a TLB is invalidated 902, a snapshot of the values of the counters associated with all of the processors is stored 904. Later, when a new address translation corresponding to an invalidated translation is requested 906, the current counter value associated with each processor is compared to its snapshot value 908 to determine whether the processor entered VMM mode during the time period between the address translation invalidation and the request for the new address translation. If the counter values are different, then the TLB of the processor associated with the counter has been flushed since the address mapping was invalidated and no further action is required with respect to the TLB before the new address translation is used 910. Because the chance that a processor has entered a VMM mode between the time an address translation is invalidated and the time a corresponding new translation is required is quite high, the number of actual TLB flushes that are undertaken is drastically reduced.

If the current and snapshot counter values are the same, then the TLB of the processor associated with the counter may not have been flushed since the address translation was invalidated. In this case, the TLB must be flushed 912 before the new address translation can be used by the processor. A request to flush the TLB may be made immediately, for example through an IPI. Alternatively, it is first determined whether the processor is operating in a VMM mode 914. If so, the processor's TLB is flushed immediately 912. If not, e.g., if the processor is operating in a guest mode, then may resume processing without immediately flushing its TLB but rather flush the TLB upon later entry into a VMM mode.

Figure 10:
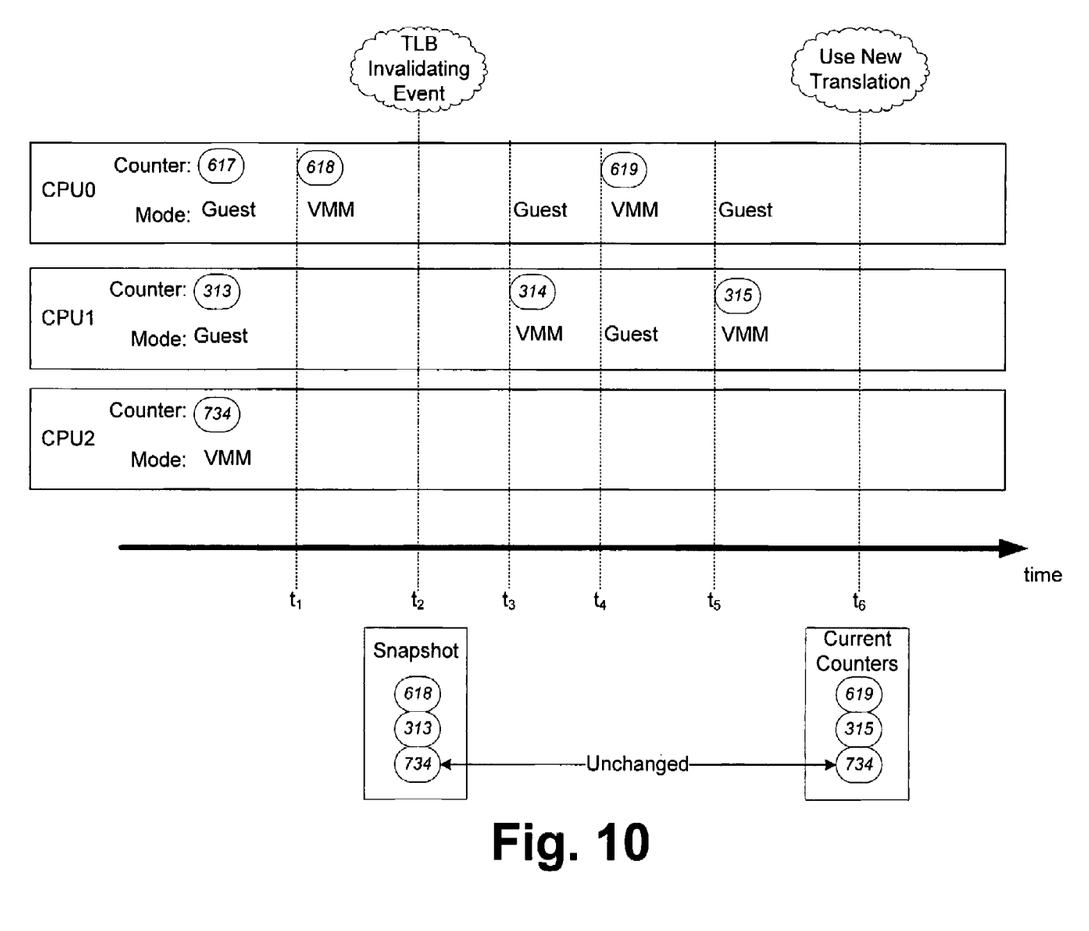
FIG. 10 is timeline depicting an illustrative example of the way of flushing TLBs as described in FIG. 9.

FIG. 10 depicts an illustrative example of this alternative embodiment. It depicts the operating modes of three processors, CPU0, CPU1, and CPU2, and the values of the counters associated with each processor over a period of time. Initially, before $t_0$, CPU0 and CPU1 are operating in a guest mode while CPU2 is operating in a VMM mode. The values of the counters are given for purposes of illustration only and by way of example. Before time $t_0$, the counter values are "617" for CPU0, "313" for CPU1, and "734" for CPU2.

The counter associated with a processor is incremented every time the processor switches into VMM mode. At time $t_1$, CPU0 switches to VMM mode and its counter is incremented to "618". Also at time $t_1$, CPU1 switches to guest mode and its counter is unchanged. At time $t_3$, CPU1 switches to VMM mode and its counter is incremented to "314", and so on.

At time t2, a TLB invalidating event, such as, for example, a page table change, occurs. When the invalidating event occurs, a snapshot of the counter values is taken and stored. In this case, the stored values would be 618, 313, and 734 for CPU0, CPU1, and CPU2 respectively. At this time, no TLB flush is undertaken even though TLB entries are now outdated. Rather, TLB flushes are postponed until an address translation associated with an invalid TLB entry is requested. In the example, the new address translation is not requested until time $t_6$. Between the time of the invalidating event at time $t_1$, when the snapshot was taken, and the use of the new translation at time $t_6$, CPU0 entered VMM mode once and CPU1 entered VMM mode twice. The TLBs associated with CPU0 and CPU1 were flushed when they entered VMM mode after the TLB was invalidated and, therefore, the TLBs contain no invalid entries corresponding to the newly requested address translation. Thus, no action is required with respect to flushing the TLBs associated with CPU0 and CPU1. The fact that the two processors entered VMM mode and the TLBs were flushed is reflected in the change in the counter values between the snapshot values and the current values.

CPU2 remained in a VMM mode during the entire period between the TLB invalidation at time $t_1$, and the request for the new address translation at time $t_6$. This fact is reflected in the lack of change in the value of the counter associated with CPU2 between the snapshot value and the current value. Thus, the TLB associated with CPU2 may contain an invalid address mapping translation related to the request at time $t_6$ and the TLB should be flushed immediately.

While the present disclosure has been described in connection with various embodiments, illustrated in the various figures, it is understood that similar aspects may be used or modifications and additions may be made to the described aspects of the disclosed embodiments for performing the same function of the present disclosure without deviating therefrom. For example, in various aspects of the disclosure, mechanisms were disclosed for improving the operational efficiency of TLBs in multiprocessor environments. However, other equivalent mechanisms to these described aspects are also contemplated by the teachings herein.

Therefore, the present disclosure should not be limited to any single aspect, but rather construed in breadth and scope in accordance with the appended claims.

What is claimed:

1. A system for managing the use of address mapping caches, comprising:
   a plurality of processors, each processor having at least one associated address mapping cache; and
   first logic that in response to the invalidation of an address mapping cache signals only processors operating in a virtual machine monitor mode to flush their associated address mapping caches, wherein processors operating in a guest mode are not signaled to flush their associated address mapping caches to postpone or avoid such flushing.

2. The system of claim 1, further comprising:
   a plurality of flags, each flag being associated with a processor;
   second logic that sets the flags in the plurality of flags when an address mapping cache is invalidated; and
   third logic that instructs a processor to flush its associated mapping cache when the processor enters a virtual machine monitor mode and the flag associated with the processor is set.

3. The system of claim 2, wherein the second logic and the third logic are embodied in instructions stored on computer readable media.

4. The system of claim 1, further comprising:
   a plurality of counters, each counter being associated with a processor;
   second logic for updating a counter associated with a processor each time the processor enters a virtual machine mode;
   third logic for recording current values of the counters when an address mapping translation is invalidated; and
   fourth logic for flushing the address mapping cache associated with a processor when an address mapping translation corresponding to an invalidated address mapping translation is requested and a current value of a counter associated with the processor is unchanged from a recorded value of the counter.

5. The system of claim 1, wherein the first logic is embodied in instructions stored on computer readable media.

6. A method of clearing obsolete entries from one or more address mapping caches, each address mapping cache being associated with a corresponding one of a plurality of processors of a computing device, at least one processor operating in a virtual machine monitor mode and at least one other processor operating in a guest mode, the method comprising:
   signaling only the processors operating in a virtual machine monitor mode; and
   flushing the address mapping caches associated with the signaled processors, wherein flushing the address mapping caches for processors operating in guest mode are postponed or avoided.

7. The method of claim 6, wherein signaling only the processors operating in a virtual machine monitor mode comprises signaling all processors of the computing device operating in a virtual machine monitor mode.

8. The method of claim 6, wherein signaling only the processors operating in a virtual machine monitor mode comprises initiating an interrupt to only the processors operating in a virtual machine monitor mode.

9. The method of claim 6, further comprising signaling in response to the completion of flushing the address mapping cache associated with each of the signaled processors.

10. The method of claim 6, further comprising:
    associating a flag with each of the plurality of processors;
    when an address mapping cache is invalidated, setting the flag associated with at least those processors that are operating in a guest mode; and
    flushing the address mapping cache associated with a first processor when the first processor enters a virtual machine monitor mode with the flag associated with the first processor set.

11. The method of claim 6, further comprising:
    associating a counter with each processor;
    updating the counter associated with a processor each time the processor enters a virtual machine monitor mode;
    recording values of the counters when an address mapping translation is invalidated; and
    in response to a request for a new address mapping translation corresponding to an invalidated address mapping translation, flushing the address mapping caches associated to processors that are operating in a virtual machine monitor mode and for which a current value of the counter associated with the processor is unchanged from the recorded value for the counter when the address mapping translation was invalidated.

12. The method of claim 11, further comprising:
    associating a flag with each of the plurality of processors;
    in response to a request for a new address mapping translation corresponding to an invalidated address mapping translation, setting the flag associated to processors that are operating in a guest mode and for which a current value of the counter associated with the processor is unchanged from the recorded value for the counter when the address mapping translation was invalidated;
    flushing the address mapping cache associated with a first processor when the first processor enters a virtual machine monitor mode with the flag associated with the first processor set.

13. The method of claim 6, wherein said one or more address mapping caches comprise translation lookaside buffers (TLBs).

14. The method of claim 13, wherein signaling only the processors operating in a virtual machine monitor mode comprises initiating an interrupt to all processors of the computing device operating in a virtual machine monitor mode; and further comprising signaling in response to the completion of flushing the TLB associated with each of the signaled processors; and further comprising associating a flag with each of the plurality of processors, when a TLB is invalidated, setting the flag associated with at least those processors that are operating in a guest mode, and flushing the TLB associated with a first processor when the first processor enters a virtual machine monitor mode with the flag associated with the first processor set; and further comprising associating a counter with each processor, updating the counter associated with a processor each time the processor enters a virtual machine monitor mode, recording values of the counters when an address mapping translation is invalidated, and in response to a request for a new address mapping translation corresponding to an invalidated address mapping translation, flushing the TLB associated to processors that are operating in a virtual machine monitor mode and for which a current value of the counter associated with the processor is unchanged from the recorded value for the counter when the address mapping translation was invalidated.

15. A computer readable medium comprising computer executable instructions for managing address mapping caches, each address mapping cache being associated with a corresponding one of a plurality of processors of a computing device, the instructions comprising instructions for signaling only processors operating in a virtual machine monitor mode to flush their associated address mapping caches, wherein processors operating in a guest mode are not signaled to flush their associated address mapping caches to postpone or avoid such flushing.

16. The computer readable medium of claim 15, further comprising computer executable instructions for managing a plurality of flags, each flag being associated with one of the plurality of processors, the instructions comprising instructions for:
    setting the flag associated with at least those processors that are operating in a guest mode when an address mapping cache is invalidated; and
    flushing the address mapping cache associated with a processor when the processor enters a virtual machine monitor mode with the flag associated with the processor set.

17. The computer readable medium of claim 15, further comprising computer executable instructions for managing a plurality of counters, each counter being associated with one of the plurality of processors, the instructions comprising instructions for:
    updating the counter associated with a processor each time the processor enters a virtual machine monitor mode;
    recording values of the counters when an address mapping translation is invalidated; and
    in response to a request for a new address mapping translation corresponding to an invalidated address mapping translation, flushing the address mapping caches associated to processors that are operating in a virtual machine monitor mode and for which a current value of the counter associated with the processor is unchanged from the recorded value for the counter when the address mapping translation was invalidated.

* * * * *